(12) United States Patent
Jin

(10) Patent No.: US 7,487,519 B2
(45) Date of Patent: Feb. 3, 2009

(54) DOOR INTERLOCK UNIT AND DISK RECORDING/REPRODUCING APPARATUS WITH THE SAME

(75) Inventor: Seong-ki Jin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 733 days.

(21) Appl. No.: 11/185,872

(22) Filed: Jul. 21, 2005

(65) Prior Publication Data

US 2006/0020955 A1  Jan. 26, 2006

(30) Foreign Application Priority Data

Jul. 24, 2004  (KR) .................. 10-2004-0058076

(51) Int. Cl.
*G11B 33/02* (2006.01)

(52) U.S. Cl. ..................................... 720/647
(58) Field of Classification Search ................ 720/647
See application file for complete search history.

(56) References Cited

U.S. PATENT DOCUMENTS

2003/0016612 A1*  1/2003  Lin ........................ 369/75.1

FOREIGN PATENT DOCUMENTS

| CN | 1469378 | 1/2004 |
|---|---|---|
| JP | 9-282758 | 10/1997 |
| JP | 9-288855 | 11/1997 |
| JP | 2003-242705 | 8/2003 |
| KR | 212486 | 11/2000 |
| KR | 2001-51047 | 6/2001 |
| KR | 2004-3590 | 1/2004 |

OTHER PUBLICATIONS

Chinese Office Action for corresponding Chinese Patent Application No. 2005100848952 dated Jan. 25, 2008 (4 pgs).
European Search Report for European Patent Application No. 05254592.8 dated Mar. 29, 2007 (in English).
Korean Office Action issued Jan. 31, 2006, in Korean Patent Application No. 2004-58076 filed Jul. 24, 2004, which corresponds to U.S. Appl. No. 11/185,872.

* cited by examiner

*Primary Examiner*—David D Davis
(74) *Attorney, Agent, or Firm*—Staas & Halsey LLP

(57) ABSTRACT

A door interlock unit to be used with a disk recording/reproducing apparatus having a disk tray and a door through which the disk tray moves in and out of the disk recording/reproducing apparatus, the door interlock unit including a restricting member to restrict the door from being opened in response to the disk tray being positioned inside the disk recording/reproducing apparatus, wherein the restricting member is engaged by the disk tray entering the disk recording/reproducing apparatus; and/or a restricting member to restrict the disk tray from moving toward a disk loading position in the disk recording/reproducing apparatus in response to the door being in an open position; wherein the restricting member is coupled to the door so as to be engaged and disengaged by the door opening and closing, respectively.

26 Claims, 8 Drawing Sheets

DOOR INTERLOCK UNIT AND DISK RECORDING/REPRODUCING APPARATUS WITH THE SAME

CROSS-REFERENCE TO RELATED APPLICATIONS

This application claims the benefit of Korean Patent Application No. 2004-58076, filed on Jul. 24, 2004, in the Korean Intellectual Property Office, the disclosure of which is incorporated herein by reference.

BACKGROUND OF THE INVENTION

1. Field of the Invention

The present invention relates to an apparatus to record/reproduce information in a disk, such as CD-ROM driver, video disk device, digital audio device, DVD player, etc. More particularly, the present invention relates to a door interlock unit to prevent a door, through which a disk tray accesses the apparatus, from being forcibly opened, and a disk recording/reproducing apparatus with the door interlock unit.

2. Description of the Related Art

In general, a disk recording/reproducing apparatus records information in a disk-shaped medium, or reproduces the information from the medium. The disk recording/reproducing apparatus includes a disk tray and a door which opens/closes an opening formed at a front panel to allow the disk tray access to a body of the apparatus. The door is generally divided into an integral door, which is integrally formed with the disk tray, and a detached door detached from the disk tray.

FIGS. 1 and 2 show a conventional disk recording/reproducing apparatus with a detached door.

The disk recording/reproducing apparatus 10 includes a body 11, a disk tray 12, a front panel 13, a door 14, and a torsion spring 15.

The disk tray 12 is connected to the body 11 in such a manner that the disk tray can slidably reciprocate in a first moving direction B or C. The front panel 13 is assembled to a front side of the body 11. The front panel 13 is provided with an opening 31 through which the disk tray 12 reciprocates, supporting parts 32 and 32' to which the door 14 is assembled, and a rear side 34 to which one arm 51 of the torsion spring 15 is secured.

The door 14 closes the opening 31 so as not to expose an interior of the body 11 when the disk tray 12 is inserted into the body 11 and is positioned to load the disk. The door 14 is provided at both ends thereof with left and right hinge arms 41 and 41' pivotally coupled to the supporting parts 32 and 32', respectively.

The right hinge arm 41' is provided with a restricting part 42 to contact the rear side 34 of the front panel 13, and thus prevent the door from further rotating, when the disk tray 12 is inserted into the body 11 and the door is closed. The torsion spring 15 is provided to the right hinge arm 41'. One end 51 of the torsion spring 15 is coupled to the rear side 34 of the front panel 13, while the other end 52 is coupled to the restricting part 42, such that a resilient force is applied to the door 14 to rotate the door 14 in a door closing direction D.

With the above-described construction, when the disk tray 12 is inserted into the body 11 and is positioned to load the disk, the door 14 is closed by the resilient force of the torsion spring 15 provided between the restricting part 42 and the rear side 34 of the front panel 13. Then, when the disk tray 12 slides in a first moving direction B to eject or receive the disk, a front side 21 of the disk tray 12 makes contact with the door 14, so that the door 14 is pushed and rotated in a door opening direction E. The disk tray 12 comes out of the body 11 through the opening 31, and is positioned at a position for ejecting or receiving the disk. When the disk tray 12 again slides in the first moving direction C to be inserted into the interior of the body 11, the door 14 is rotated in the door closing direction D by the resilient force of the torsion spring 15 to again close the opening 31.

According to the conventional disk recording/reproducing apparatus 10, the door 14 is closed by means of the force of the spring only. After the disk tray 12 is inserted into the body 11, when the door 14 is forcibly opened by a child or other user through carelessness during operation of the disk recording/reproducing apparatus 10, an accident may result from the disk rotating at a high speed.

Recently, there has been a trend of increasing a rotation speed of the disk, as well as a high capacity of information storage.

In other words, the rotation speed of the disk has rapidly increased from 1× speed to 16× speed through 32× and 52× speed. For the 16× speed, the disk rotates at a rotation speed of about 3,600 rpm (revolution per minute), while for the 52× speed, the disk rotates at a rotation speed of about 12,000 rpm.

In such a case, if a child or other user touches the disk rotating at a high speed with her/his finger, her/his finger may be injured by the rotating disk. At this time, if the rotating disk is touched by a rod, or the disk is slightly cracked, the disk may be ruptured due to the rotary force of the disk rotating at the high speed. Fragments of the ruptured disk may be very rapidly scattered in all directions. If the fragments of the ruptured disk escape from the body 11, a human body may be injured by the scattered fragments.

In addition, the conventional disk recording/reproducing apparatus 10 can start a play operation automatically, even though the child or other user forcibly pushes the disk tray 12 into the body 11 and then causes the opened door 14 to remain open. At that time, the child or other user may be injured by the disk rotating at high speed.

SUMMARY OF THE INVENTION

An aspect of the present invention is to solve the above described and/or other problems pertaining to a conventional disk recording/reproducing apparatus, and to provide a door interlock unit to prevent a door from being forcibly opened when a disk tray is positioned at a disk loading position, and a disk recording/reproducing apparatus with the door interlock unit.

Another aspect of the present invention is to provide a door interlock unit to prevent a disk tray from being moved to a disk loading position when a door is forcibly opened, and a disk recording/reproducing apparatus with the door interlock unit.

Additional aspects and/or advantages of the invention will be set forth in part in the description which follows and, in part, will be apparent from the description, or may be learned by practice of the invention.

In order to achieve the above and/or other aspects of the invention, there is provided a door interlock unit to be used with a disk recording/reproducing apparatus, the apparatus including a front panel having an opening, a disk tray which is movable between a first position at which it is ejected out of the front panel through the opening and a second position at which it is inserted into the front panel, a door pivotally installed to the front panel to rotate between an open position to open the opening and a closed position to close the opening, and an elastic member applying an elastic force to the door to rotate the door to the closed position, the door interlock unit comprising: at least one member to prevent the door from being forcibly opened, wherein the at least one member selectively restricts the rotation of the door according to a position of the disk tray, and selectively restricts movement of the disk tray according to a position of the door.

The at least one member may restrict the rotation of the door to the open position in response to the disk tray being positioned at the second position, and may restrict movement of the disk tray to the second position in response to the door being positioned at the open position.

The at least one member may include a first opening prevention member being movable between a protruded position at which the first opening prevention member protrudes outward from a longitudinal edge of the disk tray and a retracted position at which the first opening prevention member is retracted so as not to protrude from the longitudinal edge of the disk tray, the first opening prevention member moving in cooperation with movement of the disk tray moving between the first position and the second position; and a second opening prevention member being movable between a blocking position on a moving path of the first opening prevention member and an unblocking position out of the moving path of the first opening prevention member, the second opening prevention member moving in cooperation with movement of the door between the open position and closed position, wherein the first opening prevention member does not move to the protruded position to prevent the disk tray from being moved in response to the second opening prevention member being positioned at the blocking position, and the second opening prevention member does not move to the blocking position to prevent the door from being rotated in response to the first opening prevention member being positioned at the protruded position.

The door interlock unit may further comprise a pickup base with a provided turntable, and a lift guide to lift the pickup base, wherein the first opening prevention member may include an extension element protruding from the lift guide in a direction perpendicular to a moving direction of the disk tray.

The second opening prevention member may include a blocking element on one side of the door, the blocking element being at approximately a right angle relative to the extension element. The blocking wing may include a blocking surface, formed in a direction perpendicular to the moving direction of the extension element, to block movement of the extension element to the protruded position in response to the blocking element being positioned at the blocking position; and a hook surface, formed in parallel with the moving direction of the extension element and abutting against the extension element, to restrict movement of the blocking element to the blocking position in response to the extension element being positioned at the protruded position.

The elastic member may include an extension spring having one end supported by the blocking element and a second end supported by the front panel.

The door interlock unit may further include a reinforcing member provided to the front panel to support and/or reinforce the second opening prevention member. The reinforcing member supports the second opening prevention member in response to the first opening prevention member attempting to move to the protruded position and contacting the second opening prevention member while the second opening prevention member is positioned at the blocking position.

According to another aspect of the present invention, there is provided a disk recording/reproducing apparatus including a front panel assembly including a front panel having an opening, a door pivotally installed to the front panel to rotate between an open position to open the opening and a closed position to close the opening, and an elastic member applying an elastic force to the door to rotate the door to the closed position; a body including a disk tray which is movable between a first position at which the disk tray is ejected out of the front panel through the opening and a second position at which the disk tray is inserted into the front panel, and a lift guide to lift a pickup base with a turntable installed thereon; and a door interlock unit including at least one member to prevent the door from being forcibly opened, wherein the at least one member selectively restricts the rotation of the door according to a position of the disk tray, and selectively restricts movement of the disk tray according to a position of the door.

The at least one member may restrict the rotation of the door to the open position in response to the disk tray being positioned at the second position, and may restrict movement of the disk tray to the second position in response to the door being positioned at the open position.

The at least one member may include a first opening prevention member being movable between a protruded position at which the first opening prevention member protrudes outward from a longitudinal edge of the disk tray and a retracted position at which the first opening prevention member is retracted so as not to protrude from the longitudinal edge of the disk tray, the first opening prevention member moving in cooperation with movement of the disk tray moving between the first position and the second position; and a second opening prevention member being movable between a blocking position on a moving path of the first opening prevention member and an unblocking position out of the moving path of the first opening prevention member, the second opening prevention member moving in cooperation with movement of the door between the open position and closed position, wherein the first opening prevention member does not move to the protruded position to prevent the disk tray from being moved in response to the second opening prevention member being positioned at the blocking position, and the second opening prevention member does not move to the blocking position to prevent the door from being rotated in response to the first open preventing member being positioned at the protruded position.

The first opening prevention member may include an extension member protruding from the lift guide in a direction perpendicular to a moving direction of the disk tray.

The second opening prevention member may include a blocking element on one side of the door, the blocking element being at approximately a right angle relative to the extension element.

The blocking element may include a blocking surface, formed in a direction perpendicular to the moving direction of the extension element, to block movement of the extension element to the protruded position in response to the blocking element being positioned at the blocking position; and a hook surface, formed in parallel with the moving direction of the extension element and abutting against the extension element, to restrict movement of the blocking element to the blocking position in response to the extension element being positioned at the protruded position.

The elastic member may include an extension spring having one end supported by the blocking element and a second end supported by the front panel.

The door interlock unit may further include a reinforcing member provided to the front panel to support and/or reinforce the second opening prevention member. The reinforcing member supports the second opening prevention member in response to the first opening prevention member attempting to move to the protruded position and contacting the second opening prevention member while the second opening prevention member is positioned at the blocking position.

According to another aspect of the present invention, there is provided a door interlock unit to be used with a disk recording/reproducing apparatus having a disk tray and a door through which the disk tray moves in and out of the disk recording/reproducing apparatus, the door interlock unit including a restricting member to restrict the door from being opened in response to the disk tray being positioned inside the disk recording/reproducing apparatus; wherein the restricting member is engaged by the disk tray entering the disk recording/reproducing apparatus.

According to another aspect of the present invention, there is provided a door interlock unit to be used with a disk recording/reproducing apparatus having a disk tray and a door through which the disk tray moves in and out of the disk recording/reproducing apparatus, the door interlock unit including a restricting member to restrict the disk tray from moving toward a disk loading position in the disk recording/reproducing apparatus in response to the door being in an open position; wherein the restricting member is coupled to the door so as to be engaged and disengaged by the door opening and closing, respectively.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
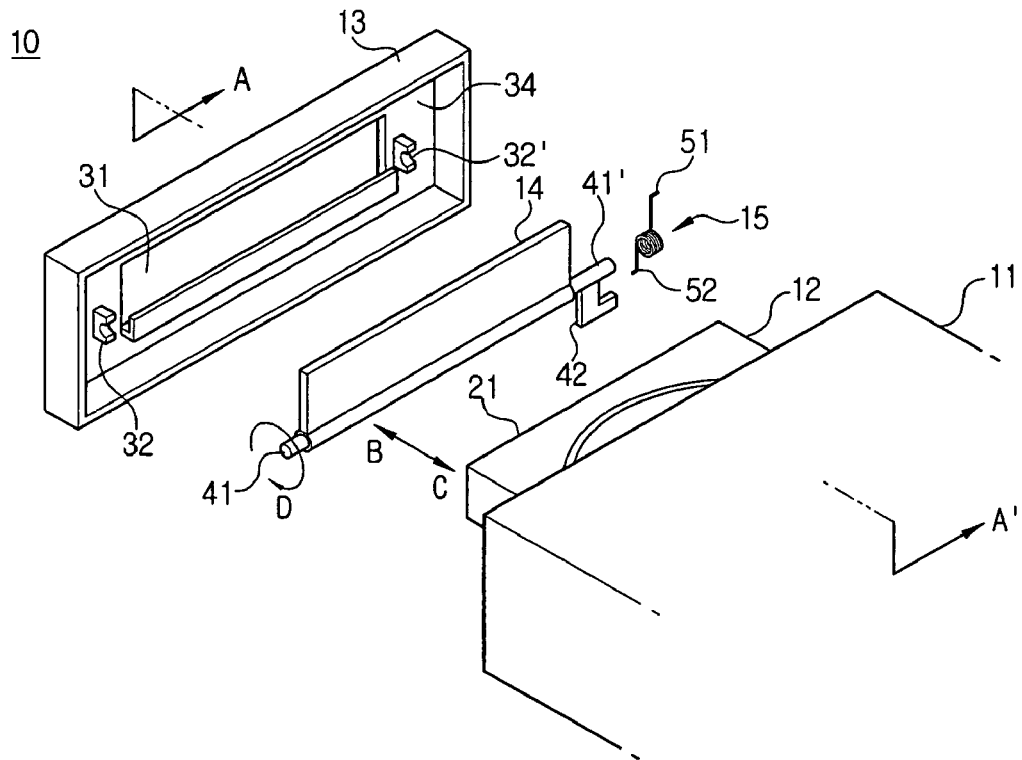
FIG. 1 is an exploded perspective view of a conventional disk recording/reproducing apparatus.
Figure 2:
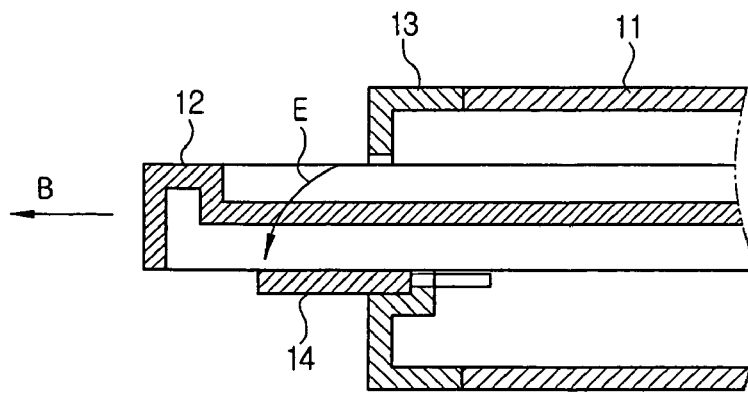
FIG. 2 is a cross-sectional view taken along a line A-A' in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Some of the following construction and elements defined in the description are merely provided to assist in a comprehensive understanding of the invention. Thus, it is apparent that the present invention may be carried out without all of these defined matters as described. Also, well-known functions or constructions are not described in detail since they would obscure the invention in unnecessary detail.

Figure 3:
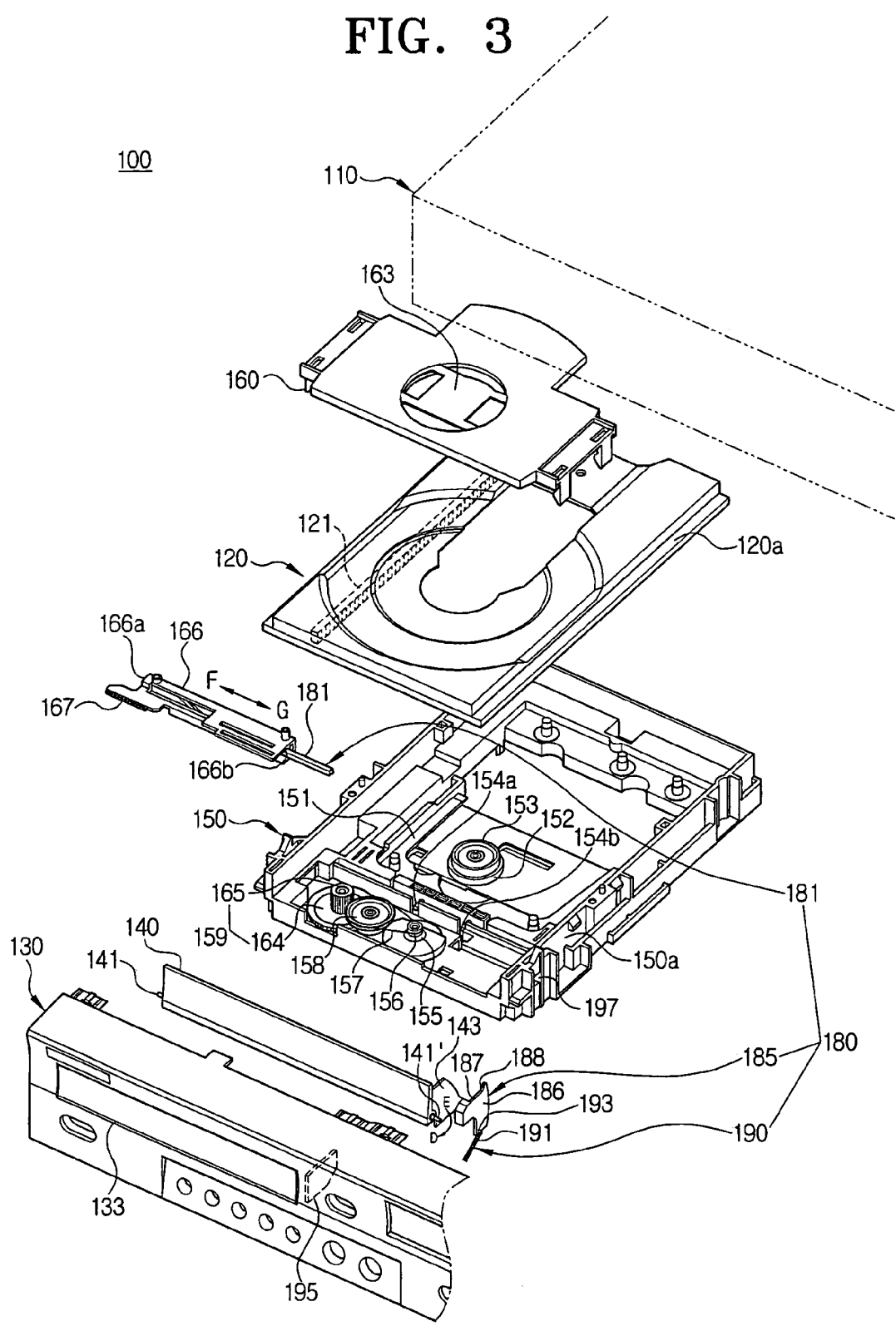
FIG. 3 is an exploded perspective view of a disk recording/reproducing apparatus including a door interlock unit according to an embodiment of the present invention.

FIG. 3 shows a disk recording/reproducing apparatus 100 including a door interlock unit according to an embodiment of the present invention.

The disk recording/reproducing apparatus 100 includes a front panel 130, a main base 150, a pickup base 151, a disk tray 120, a disk clamping member 160, a door interlock unit 180, and a housing 110, in which the main base 150, the pickup base 151, the disk tray 120, the disk clamping member 160, and the housing 110 constitute a body of the disk recording/reproducing apparatus 100.

The front panel 130 includes an opening 133 opened/closed by a door 140. The door 140 is pivotally supported to a support bracket (not shown) of the opening 133 by left and right hinge arms 141 and 141' formed at a lower portion of the door 140. When the disk tray 120 moves, the door 140 pivots between an open position (see FIGS. 5A and 5B), at which the opening 133 is opened by the disk tray 120, and a closed position (see FIGS. 4A and 4B), at which the opening 133 is closed by the disk tray 120. The front panel 130 and the door 140 constitute a front panel assembly engaged with the body.

The main base 150 is provided at a front end thereof with a loading motor 155 to supply a power to move the disk tray 120 and a power to lift the pickup base 151.

The power of the loading motor 155 is transferred from a motor pulley 156, coupled to an output shaft, through a belt 157 to a gear pulley 158. A first gear (not shown) formed at a lower portion of the gear pulley 158 is meshed with a second gear 164 of a loading gear 159 to transfer the power from the loading motor 155 to the loading gear 159.

The power transferred to the loading gear 159 is transferred to a first rack gear 121 formed at a lower surface of the disk tray 120 through a pinion gear 165 of the loading gear 159, so that the disk tray 120 is moved between a disk unloading position (see FIG. 5A), at which the disk tray is ejected outward from the front panel 130 through the opening 133, and a disk loading position (see FIG. 4A), into which the disk is inserted into the front panel 130.

In addition, the power transferred to the loading gear 159 is transferred to a second rack gear 167 formed at a first end 166a of a lift guide 166 through the pinion gear 165 of the loading gear 159, so that the lift guide 166 is moved in a second moving direction (direction F or G in FIGS. 4B, 5B and 7) perpendicular to a first moving direction (direction B or C in FIG. 5A) of the disk tray 120 by the loading motor 155.

Figure 7:
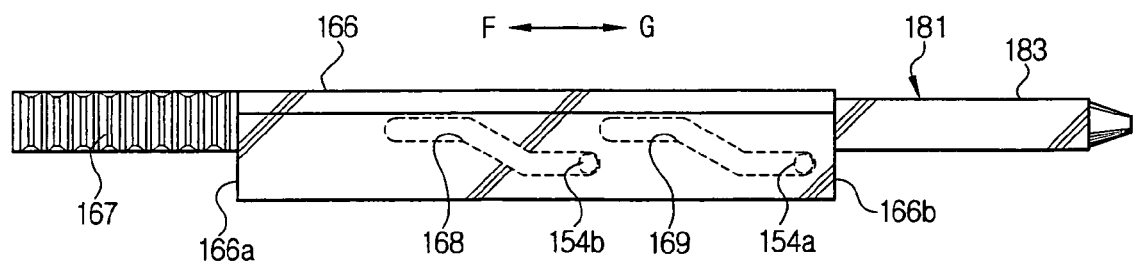
FIG. 7 is a front view of a lift guide of the disk recording/reproducing apparatus in FIG. 3.

The lift guide 166 is provided with cam grooves 168 and 169 (FIG. 7). Guide bosses 154a and 154b of the pickup base 151 are inserted into the cam grooves 168 and 169, respectively.

The pickup base 151 is installed on the main base 150. The pickup base 151 has a front end which is moved up and down at a desired angle by a supporting shaft (not shown) pivotally supported to the main base 150 at a rear end thereof. The pickup base 151 is provided at the front end thereof with guide bosses 154a and 154b guided by the cam grooves 168 and 169 of the lift guide 166.

A spindle motor 152 is provided to the pickup base 151, and a turntable 153, on which a disk is seated, is provided to an output shaft of the spindle motor 152.

The disk clamping member 160 to clamp the disk seated on the turntable 153 is secured to the main base 150 on the turntable 153. The disk clamping member 160 is provided at a center thereof with a clamp 163. The construction of the clamp 163 is widely known, the description of which will be omitted herein.

Figure 4A:
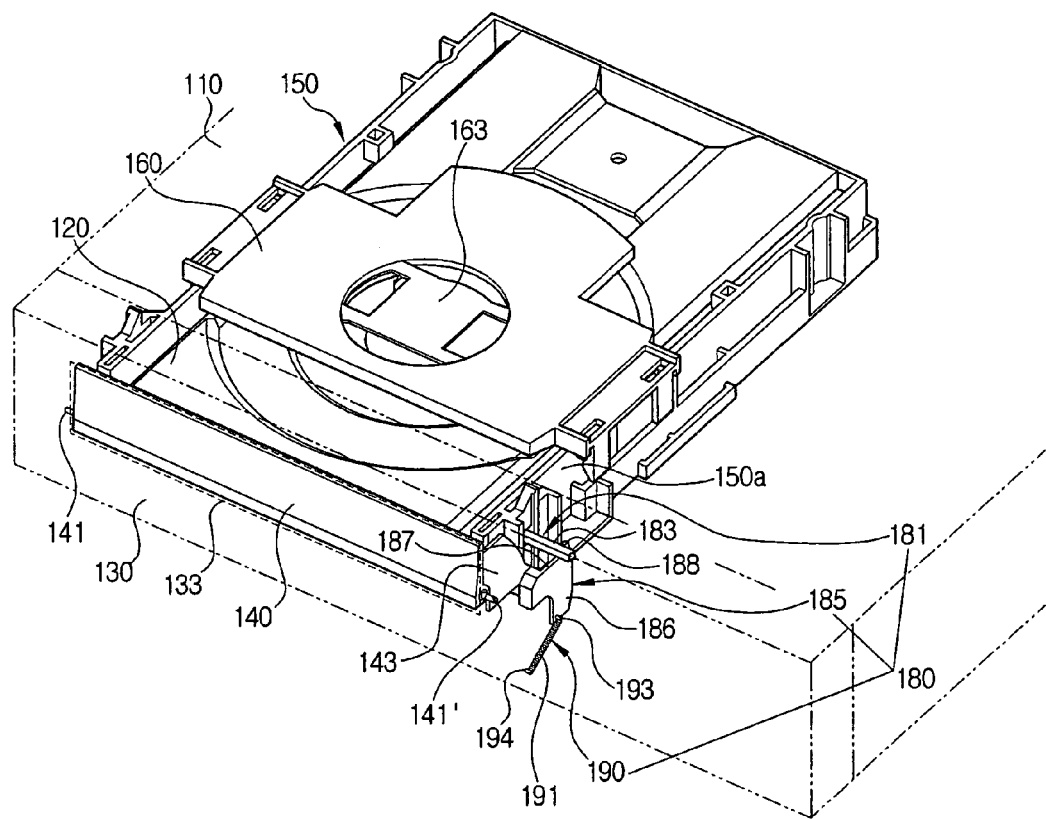
FIG. 4A is a partially perspective view of the disk recording/reproducing apparatus in FIG. 3, in which a disk tray is positioned at a disk loading position.
Figure 5A:
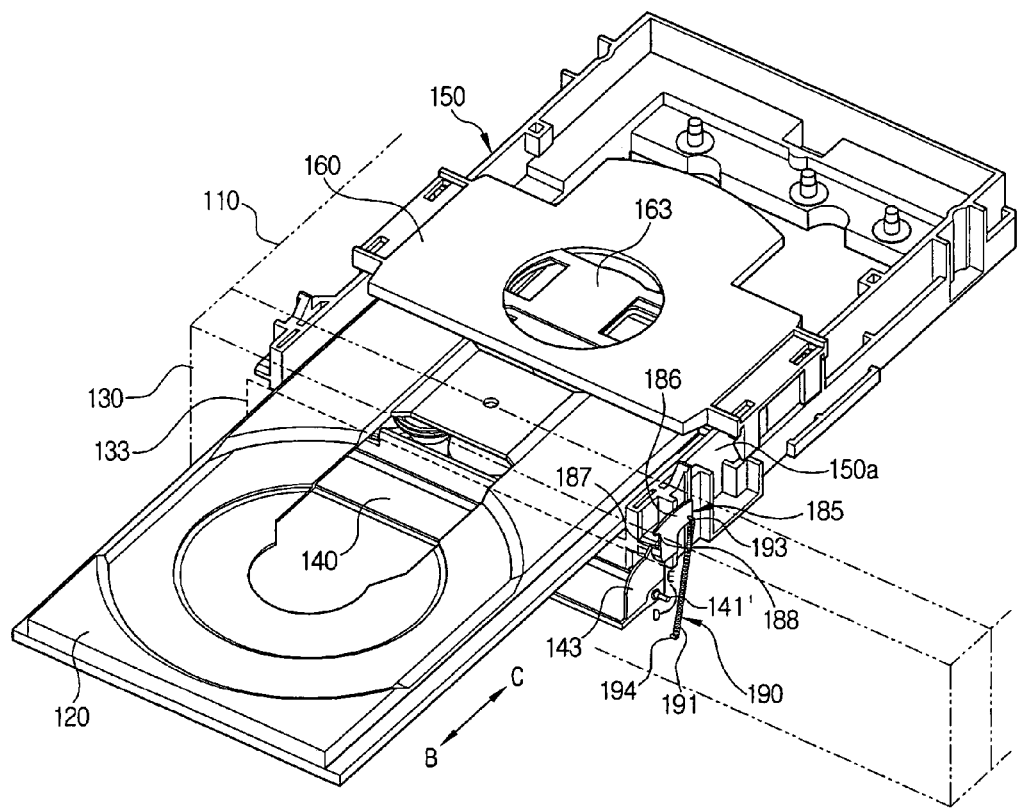
FIG. 5A is a partially perspective view of the disk recording/reproducing apparatus in FIG. 3, in which a disk tray is positioned at a disk unloading position.
Figure 5B:
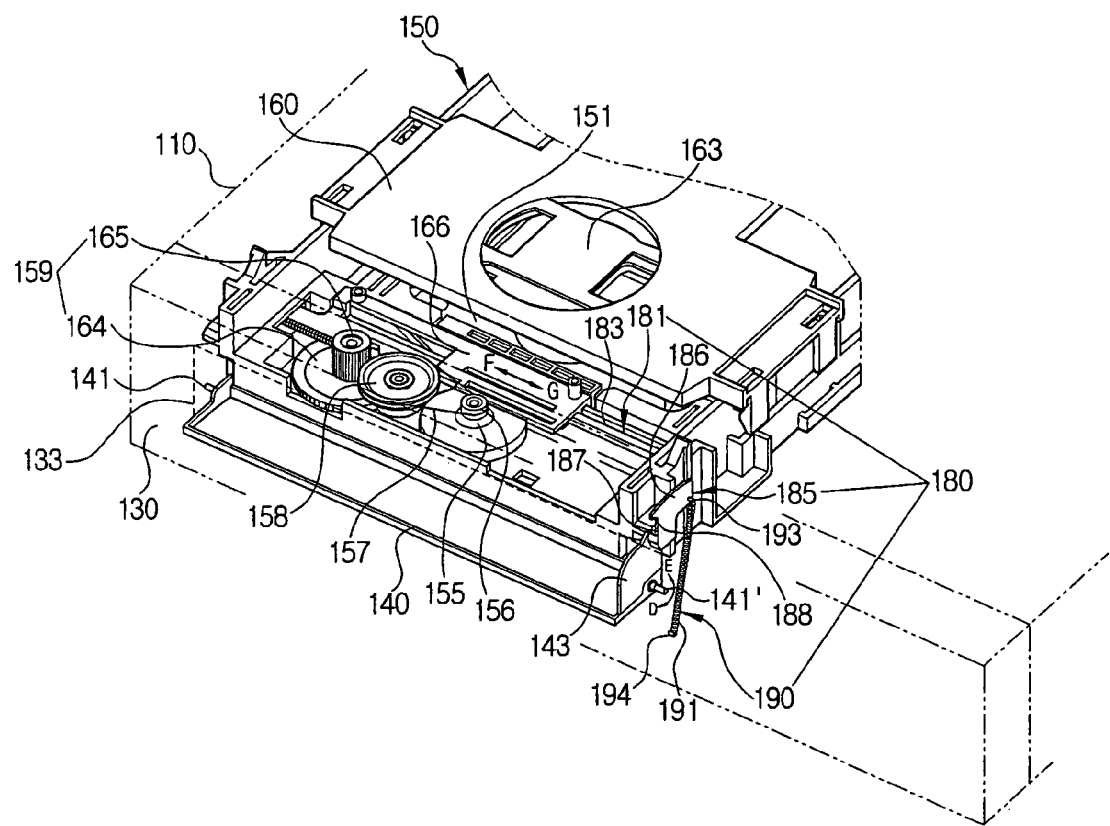
FIG. 5B is a partially perspective view of the disk recording/reproducing apparatus in FIG. 5A, in which the disk tray is removed.

The door interlock unit 180 restricts opening of the door 140 when the disk tray 120 is positioned at the disk loading position (FIG. 4A), and also restricts movement of the disk tray 120 toward the disk loading position when the door 140 is opened (FIG. 5B).

The door interlock unit 180 includes first and second opening prevention members 181 and 185.

The first opening prevention member 181 comprises an extension element, such as a straight protruding bar 183, which protrudes from a second end 166b of the lift guide 166, which lifts the pickup base 151 with the turntable provided, in a direction perpendicular to the first moving direction (direction B or C) of the disk tray 120. The protruding bar 183 may have a round-shaped front end.

The protruding bar 183 moves in cooperation with the movement of the disk tray 120 moving between the disk unloading position (FIG. 5A) and the disk loading position (FIG. 4A) by the loading motor 155, and is moved between a projected position (FIGS. 4B and 6A) and a retracted position (FIGS. 5B and 6C) by movement of the lift guide 166 moving in the second moving direction (direction F or G) perpendicular to the first moving direction (direction B or C) of the disk tray 120. At the protruded position, the protruding bar 183 is protruded outward from a longitudinal edge 120a of the disk tray 120, i.e., a side wall 150a of the main base 150, through an access opening 197 formed at the side wall 150a of the main base 150. At the retracted position, the protruding bar 183 is retracted into the side wall 150a of the main base 150.

Figure 4B:
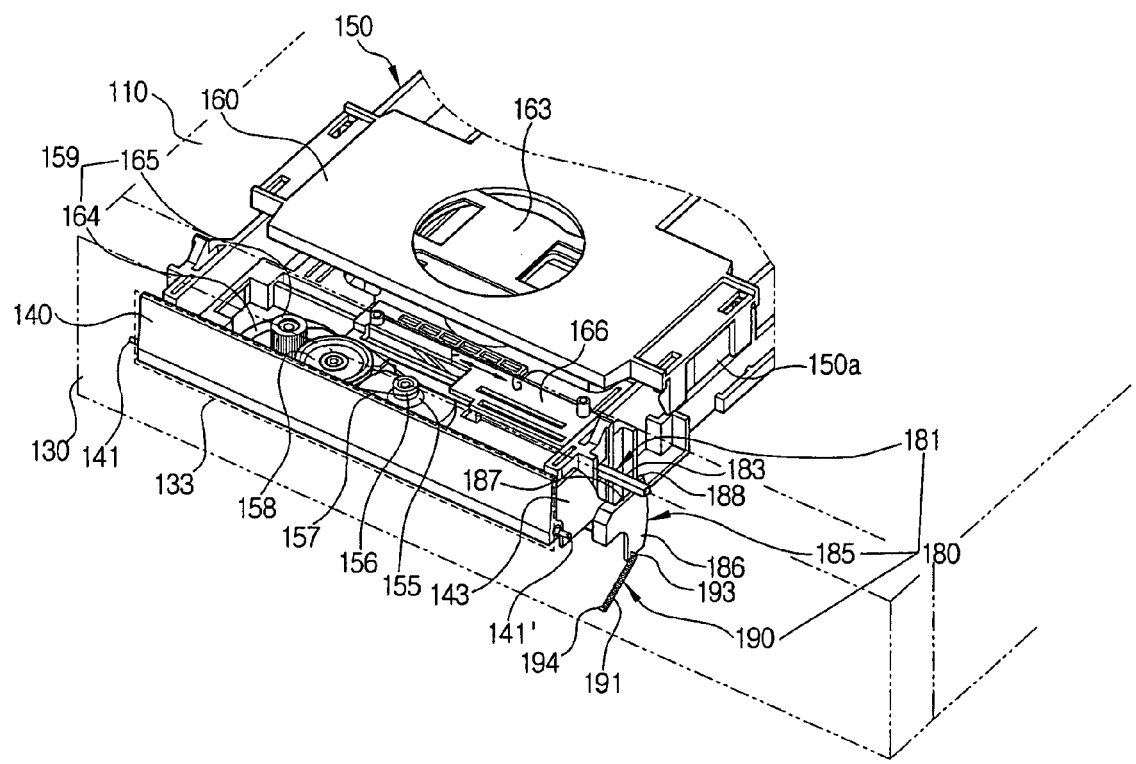
FIG. 4B is a partially perspective view of the disk recording/reproducing apparatus in FIG. 4A, in which the disk tray is removed.
Figure 6A:
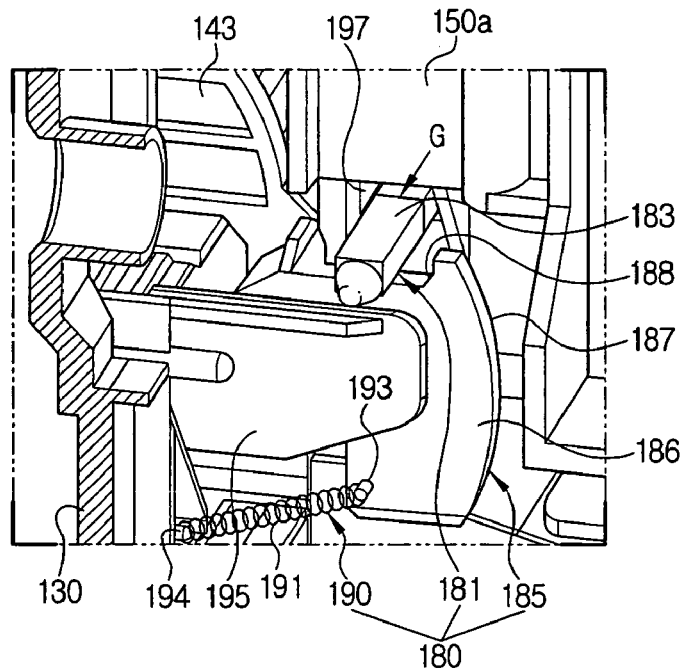
FIGS. 6A through 6C are partially perspective views depicting operation of a door interlock unit for the disk recording/reproducing apparatus in FIG. 3.

Specifically, when the disk tray 120 is positioned at the disk loading position (FIG. 4A), the protruding bar 183 is positioned at the protruded position (FIGS. 4B and 6A). Conversely, when the disk tray 120 is positioned at the disk unloading position (FIG. 5A), the protruding bar 183 is positioned at the retracted position (FIGS. 5B and 6C).

The second opening prevention member 185 comprises a blocking element, such as a blocking wing 186, protruding from a bracket 143 adjacent to the right hinge arm 141' of the door 140, the blocking wing 186 being at a right angle relative to the protruding bar 183. The blocking wing 186 may be formed with an L-shaped plate.

The blocking wing 186 moves in cooperation with the pivoting movement of the door 140 moving between the open position and the closed position, and is moved between a blocking position (FIG. 5B) within a moving path of the protruding bar 183 and unblocking position (FIGS. 4B and 6A) out of the moving path of the protruding bar 183.

Specifically, when the door 140 is positioned at the open position (FIG. 5B), the blocking wing 186 is positioned at the blocking position (FIG. 5B). Conversely, when the door 140 is positioned at the closed position (FIG. 4B), the blocking wing 186 is positioned at the unblocking position (FIGS. 4B and 6A).

The blocking wing 186 includes a blocking surface 187 formed in a direction perpendicular to the second moving direction (direction F or G) of the protruding bar 183, and a hook surface 188 protruding in parallel with the second moving direction (direction F or G) of the protruding bar 183.

Figure 6B:
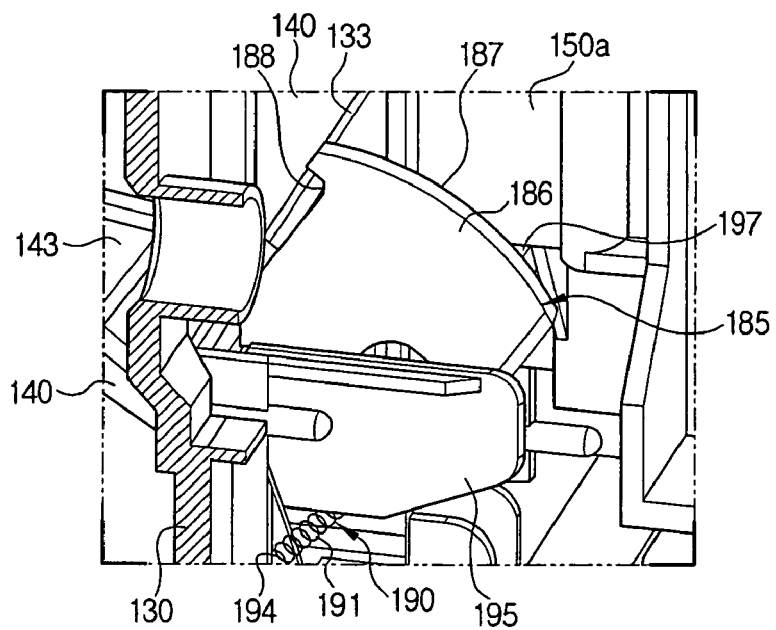
Figure 6C:
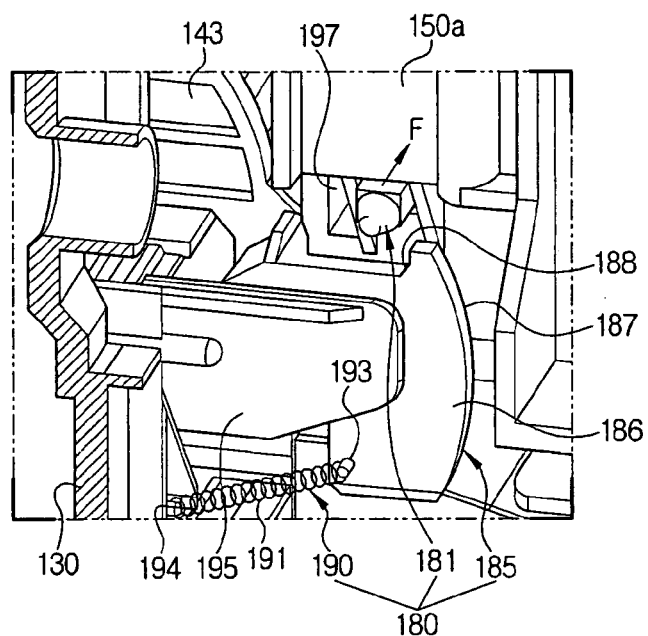

As shown in FIG. 6B, in the case in which the door 140 is opened and the blocking wing 186 is positioned at the blocking position, when the disk tray 120 is inserted into the disk loading position, the blocking surface 187 blocks the movement of the protruding bar 183 toward the protruding position. The lift guide 166, which is moved with the disk tray 120 in the second direction by the loading motor 155, is blocked by the protruding bar 183, which is blocked by the blocking surface 187, thereby stopping the loading motor 155. At that time, when the loading motor 155 is stopped over a predetermined time, for example, 3 seconds, a controller (not shown) determines that the door 140 is opened or the disk tray 120 is obstructed by an object such as a user's finger. Thus, the loading motor 155 is rotated in a reverse direction by control of the controller, so that the disk tray 120 is returned to its original position (unloading position).

As shown in FIG. 6A, in the state in which the disk tray 120 is positioned at the disk loading position and the protruding bar 183 is positioned at the protruded position, when the door 140 attempts to rotate to the open position, the hook surface 188 abuts against the protruding bar 183 to restrict the movement of the blocking wing 186 toward the blocking position. Therefore, the door 140 is not opened.

An elastic member 190 is displaced under the blocking wing 186 to apply an elastic force to the door 140 in a direction (direction D in FIGS. 3, 5A and 5B) of pivoting the door 140 toward the closed position.

The elastic member 190 may include an extension spring 191 having one end supported by a first latch 193 provided at a lower portion of the blocking wing 186, and the other end supported by a second latch (indicated by 194 in FIGS. 6A and 6C) provided at an inner surface of the front panel 130.

As shown in FIGS. 6A to 6C, the door interlock unit 180 also includes a reinforcing rib 195 provided at an inner surface of the front panel 130 to support and reinforce the blocking wing 186. The reinforcing rib 195 is formed opposite to the blocking wing 186 positioned at the unblocking position so as not to prevent the movement of the protruding bar 183. Accordingly, the reinforcing rib 195 supports and reinforces the blocking wing 186 abutting with the protruding bar 183 to restrict the movement of the protruding bar 183, when the protruding bar 183 is moved to the protruded position in the state in which the blocking wing 186 is positioned at the blocking position.

The operation of the disk recording/reproducing apparatus 100 including the door interlock unit 180 of this embodiment of the present invention will now be described in detail with reference to FIGS. 3 to 7.

First, an operation of the disk tray 120 will be described in which, after a disk is loaded on the disk tray 120 positioned at the disk unloading position, the disk tray 120 is moved to the disk loading position, as shown in FIG. 5A.

When a button (not shown) to operate the tray is turned on, the controller operates to rotate the loading motor 155 in one direction, e.g., clockwise direction, to load the disk tray 120. At that time, if the disk tray 120 is forcibly pushed into the loading position, the controller detects the movement of the disk tray 120 by means of a detecting sensor (now shown), and rotates the loading motor 155 in a counterclockwise direction.

As the loading motor 155 rotates, the disk tray 120 is moved in the first moving direction C by the power of the loading motor 155 transferred through the motor pulley 156, the belt 157, the gear pulley 158, the pinion gear 165 of the loading gear 159, and the first rack gear 121.

In addition, the lift gear 166 is moved in the second moving direction G by the power of the loading motor 155 transferred through the second rack gear 167 meshed with the pinion gear 165.

As such, when the disk tray 120 is moved and its front end passes through the opening 133 of the front panel 130, the door 140 is rotated in the closed direction D by tension of the extension spring 191, and is thus closed.

Then, if the disk tray 120 is completely positioned at the disk loading position, the pickup base 151, which is moved relatively down so as not to interfere with the movement of the disk tray 120, is lifted.

More specifically, as shown in FIG. 7, the guide bosses 154a and 154b of the pickup base 151 are guided along the cam grooves 168 and 169 by the movement of the lift guide 166, which is transferred with the power from the loading motor 155 to move in the second direction G. As the guide bosses 154a and 154b are guided along the cam grooves 168 and 169, the pickup base 151 starts to lift such that the disk tray 120 is completely inserted into the front panel 130 through the opening 133.

In addition, the front end of the protruding bar 183 formed at the second end 166b of the lift guide 166 starts to protrude outward from the side wall 150a through the access opening 197 of the side wall 150a of the main base 150.

The disk laid on the disk tray 120 is seated on the turntable 153 by the lift of the pickup base 151. By a continuous lift of the pickup base 151, the turntable 153 is further moved up, and the disk seated on the turntable 153 is secured by the clamp 163. Also, as shown in FIG. 6A, the front end of the protruding bar 183 is completely protruded outward from the side wall 150a through the access opening 197 of the side wall 150a of the main base 150, which is positioned at the protruded position.

At that time, if the door 140 is pulled in the open direction E by a child or user through carelessness, the front end of the protruding bar 183 is in contact with the blocking surface 187 of the blocking wing 186 positioned at the blocking position, as shown in FIG. 6B. As such, it prevents the protruding bar 183 from being moved to the protruded position, thereby stopping the loading motor 155.

At that time, when the loading motor 155 is stopped over a predetermined time, for example, 3 seconds, the controller determines that the door 140 is opened or the disk tray 120 is obstructed by an object such as the user's finger. Thus, the loading motor 155 is rotated in a reverse direction (e.g., clockwise direction) by control of the controller, so that the disk tray 120 is returned to the unloading position, as shown in FIG. 5A.

As such, the disk recording/reproducing apparatus 100 of the present invention prevents the disk tray 120 from being inserted into the disk loading position in the case in which the door 140 is opened through carelessness. Accordingly, when, after the disk tray 120 is positioned at the disk loading position in the state that the door 140 is opened, the disk recording/reproducing apparatus is automatically operated or is operated by operating the button, a safety accident that may result when the child or other user is exposed to the disk rotating at high speed is prevented.

When the child or other user attempts to open the door 140 through carelessness during the operation of the disk recording/reproducing apparatus 100, the present invention operates as follows.

When the disk recording/reproducing apparatus 100 is operating, as shown in FIG. 4A, the disk tray 120 is positioned at the disk loading position, and the protruding bar 183 is positioned at the protruded position.

Since the hook surface 188 abuts against the protruding bar 183, as shown in FIG. 6A, when the child or other user attempts to open the door 140 through carelessness, the blocking wing 186, which is integrally formed with the bracket 143 adjacent to the right hinge arm 141' of the door 140, is restricted from moving toward the blocking position. Therefore, the door 140 is not opened.

As such, the disk recording/reproducing apparatus 100 of the present invention prevents the door 140 from being opened in operation, thereby preventing a safety accident that may result when the child or other user is exposed to the disk rotating at a high speed.

Finally, a process in which the disk tray 120 is moved from the disk loading position to the disk unloading position, as shown in FIG. 4A, will now be described.

When the button for opening/closing the tray is actuated, the controller operates the loading motor 155 to rotate in a direction (e.g., clockwise direction) to eject the disk tray 120.

As the loading motor 155 rotates, the lift guide 166 is moved in the second moving direction F by the power of the loading motor 155 transferred through the motor pulley 156, the belt 157, the gear pulley 158, the pinion gear 165 of the loading gear 159, and the second rack gear 167.

The guide bosses 154a and 154b of the pickup base 151 are guided along the cam grooves 168 and 169 by the movement of the lift guide 166, which is transferred with the power from the loading motor 155 to move in the second moving direction F. As the guide bosses 154a and 154b are guided along the cam grooves 168 and 169, the pickup base 151 starts to move down.

In addition, the front end of the protruding bar 183 formed at the second end 166b of the lift guide 166 starts to retract into the side wall 150a through the access opening 197 of the side wall 150a of the main base 150.

The clamp 163 is detached from the turntable 153 by the descent of the pickup base 151 to release the disk. By continuous descent of the pickup base 151, the turntable 153 is further moved down, and the disk seated on the turntable 153 is seated on the disk tray 120.

Then, if the pickup base 151 is completely moved down so as not to interfere with the movement of the disk tray 120, the disk tray 120 is moved in the first moving direction B by the power of the loading motor 155 transferred through the motor pulley 156, the belt 157, the gear pulley 158, the pinion gear 165 of the loading gear 159, and the first rack gear 121.

When the disk tray 120 moves and the front end of the disk tray 120 is in contact with the door 150, as shown in FIG. 6C, the front end of the protruding bar 183 is completely retracted into the side wall 150a through the access opening 197 of the side wall 150a of the main base 150.

As shown in FIG. 6B, when the front end of the disk tray 120 is further moved to push the door 150, the door 150 is rotated in the open direction (direction E in FIG. 3), so that the blocking wing 186 coupled to the bracket 143 of the door 150 is positioned at the blocking position on the moving path of the protruding bar 183.

Then, as shown in FIG. 5A, when the disk tray 120 completely reaches the disk unloading position, the loading motor 155 is stopped by the controller.

With the above description, according to the door interlock unit of the present invention, when the disk tray is positioned at the disk loading position, it prevents the door from being forcibly opened. Also, if the door is forcibly opened, the disk tray is not inserted into the disk loading position. As such, in the case in which the door is opened by a child or other user through carelessness, it can prevent a safety accident that may be result when the child or other user is exposed to the disk rotating at a high speed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A door interlock unit to be used with a disk recording/reproducing apparatus, the apparatus including a front panel having an opening, a disk tray which is movable between a first position at which the disk tray is ejected out of the front panel through the opening and a second position at which the disk tray is inserted into the front panel, a door pivotally installed to the front panel to rotate between an open position to open the opening and a closed position to close the opening, and an elastic member to apply an elastic force to rotate the door to the closed position, the door interlock unit comprising:

at least one member to prevent the door from being forcibly opened;
   wherein the at least one member selectively restricts the rotation of the door according to a position of the disk tray; and
   selectively restricts movement of the disk tray according to a position of the door.

2. The door interlock unit as claimed in claim 1, wherein the at least one member restricts the rotation of the door to the open position in response to the disk tray being positioned at the second position, and restricts movement of the disk tray to the second position in response to the door being positioned at the open position.

3. The door interlock unit as claimed in claim 2, wherein the at least one member comprises:

a first opening prevention member being movable between a protruded position at which the first opening prevention member protrudes outward from a longitudinal edge of the disk tray and a retracted position at which the first opening prevention member is retracted so as not to protrude from the longitudinal edge of the disk tray, the first opening prevention member moving in cooperation with movement of the disk tray moving between the first position and the second position; and
   a second opening prevention member being movable between a blocking position on a moving path of the first opening prevention member and an unblocking position out of the moving path of the first opening prevention member, the second opening prevention member moving in cooperation with movement of the door between the open position and closed position;
   wherein the first opening prevention member does not move to the protruded position to prevent the disk tray from being moved in response to the second opening prevention member being positioned at the blocking position; and
   the second opening prevention member does not move to the blocking position to prevent the door from being rotated in response to the first opening prevention member being positioned at the protruded position.

4. The door interlock unit as claimed in claim 3, further comprising a reinforcing member provided to the front panel to support and/or reinforce the second opening prevention member.

5. The door interlock unit as claimed in claim 4, wherein the reinforcing member supports the second opening prevention member in response to the first opening prevention member attempting to move to the protruded position and contacting the second opening prevention member while the second opening prevention member is positioned at the blocking position.

6. The door interlock unit as claimed in claim 4, wherein the reinforcing member is provided as a rib extending from the front panel.

7. The door interlock unit as claimed in claim 3, further comprising:

a pickup base with a provided turntable; and
   a lift guide to lift the pickup base;
   wherein the first opening prevention member comprises an extension element protruding from the lift guide in a direction perpendicular to a moving direction of the disk tray.

8. The door interlock unit as claimed in claim 7, wherein the extension element is a bar protruding from the lift guide.

9. The door interlock unit as claimed in claim 7, wherein the second opening prevention member comprises a blocking element on one side of the door, the blocking element being at approximately a right angle relative to the extension element.

10. The door interlock unit as claimed in claim 9, wherein the blocking element is a wing provided on the one side of the door.

11. The door interlock unit as claimed in claim 9, wherein the blocking element comprises:

a blocking surface, formed in a direction perpendicular to the moving direction of the extension element, to block movement of the extension element to the protruded position in response to the blocking element being positioned at the blocking position; and
    a hook surface, formed in parallel with the moving direction of the extension element and abutting against the extension element, to restrict movement of the blocking element to the blocking position in response to the extension element being positioned at the protruded position.

12. The door interlock unit as claimed in claim 9, wherein the elastic member comprises an extension spring having one end supported by the blocking element and a second end supported by the front panel.

13. A disk recording/reproducing apparatus comprising:

a front panel assembly comprising a front panel having an opening, a door pivotally installed to the front panel to rotate between an open position to open the opening and a closed position to close the opening, and an elastic member applying an elastic force to the door to rotate the door to the closed position;
    a body comprising a disk tray which is movable between a first position at which the disk tray is ejected out of the front panel through the opening and a second position at which the disk tray is inserted into the front panel, and a lift guide to lift a pickup base with a turntable installed thereon; and
    a door interlock unit comprising:
        at least one member to prevent the door from being forcibly opened,
        wherein the at least one member selectively restricts the rotation of the door according to a position of the disk tray, and
        selectively restricts movement of the disk tray according to a position of the door.

14. The disk recording/reproducing apparatus as claimed in claim 13, wherein the at least one member restricts the rotation of the door to the open position in response to the disk tray being positioned at the second position, and restricts movement of the disk tray to the second position in response to the door being positioned at the open position.

15. The disk recording/reproducing apparatus as claimed in claim 14, wherein the at least one member comprises:

a first opening prevention member being movable between a protruded position at which the first opening prevention member protrudes outward from a longitudinal edge of the disk tray and a retracted position at which the first opening prevention member is retracted so as not to protrude from the longitudinal edge of the disk tray, the first opening prevention member moving in cooperation with movement of the disk tray moving between the first position and the second position; and a second opening prevention member being movable between a blocking position on a moving path of the first opening prevention member and an unblocking position out of the moving path of the first opening prevention member, the second opening prevention member moving in cooperation with movement of the door between the open position and closed position;

wherein the first opening prevention member does not move to the protruded position to prevent the disk tray from being moved in response to the second opening prevention member being positioned at the blocking position; and the second opening prevention member does not move to the blocking position to prevent the door from being rotated in response to the first opening prevention member being positioned at the protruded position.

16. The disk recording/reproducing apparatus as claimed in claim 15, the door interlock unit further comprising a reinforcing member provided to the front panel to support and/or reinforce the second opening prevention member.

17. The disk recording/reproducing apparatus as claimed in claim 16, wherein the reinforcing member supports the second opening prevention member in response to the first opening prevention member attempting to move to the protruded position and contacting the second opening prevention member while the second opening prevention member is positioned at the blocking position.

18. The disk recording/reproducing apparatus as claimed in claim 16, wherein the reinforcing member is provided as a rib extending from the front panel.

19. The disk recording/reproducing apparatus as claimed in claim 15, wherein the first opening prevention member comprises an extension element protruding from the lift guide in a direction perpendicular to a moving direction of the disk tray.

20. The disk recording/reproducing apparatus as claimed in claim 19, wherein the extension element is a bar protruding from the lift guide.

21. The disk recording/reproducing apparatus as claimed in claim 19, wherein the second opening prevention member comprises a blocking element on one side of the door, the blocking element being at approximately a right angle relative to the extension element.

22. The disk recording/reproducing apparatus as claimed in claim 21, wherein the blocking element comprises:

a blocking surface, formed in a direction perpendicular to the moving direction of the extension element, to block movement of the extension element to the protruded position in response to the blocking element being positioned at the blocking position; and a hook surface, formed in parallel with the moving direction of the extension element and abutting against the extension element, to restrict movement of the blocking element to the blocking position in response to the extension element being positioned at the protruded position.

23. The disk recording/reproducing apparatus as claimed in claim 21, wherein the elastic member comprises an extension spring having one end supported by the blocking element and a second end supported by the front panel.

24. The disk recording/reproducing apparatus as claimed in claim 21, wherein the blocking element is a wing provided on the one side of the door.

25. A door interlock unit to be used with a disk recording/reproducing apparatus having a disk tray and a door through which the disk tray moves in and out of the disk recording/reproducing apparatus, the door interlock unit comprising:

a restricting member to restrict the door from being opened in response to the disk tray being positioned inside the disk recording/reproducing apparatus;

wherein the restricting member is engaged by the disk tray entering the disk recording/reproducing apparatus.

26. A door interlock unit to be used with a disk recording/reproducing apparatus having a disk tray and a door through which the disk tray moves in and out of the disk recording/reproducing apparatus, the door interlock unit comprising:

a restricting member to restrict the disk tray from moving toward a disk loading position in the disk recording/reproducing apparatus in response to the door being in an open position;

wherein the restricting member is coupled to the door so as to be engaged and disengaged by the door opening and closing, respectively.

* * * * *